US012096116B2

United States Patent
Taoki

(10) Patent No.: US 12,096,116 B2
(45) Date of Patent: Sep. 17, 2024

(54) CONTROL APPARATUS AND METHOD OF CONTROLLING THE SAME

(71) Applicant: CANON KABUSHIKI KAISHA, Tokyo (JP)

(72) Inventor: Shinya Taoki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 17/726,581

(22) Filed: Apr. 22, 2022

(65) Prior Publication Data

US 2022/0377245 A1    Nov. 24, 2022

(30) Foreign Application Priority Data

May 19, 2021    (JP) .................................. 2021-084817

(51) Int. Cl.
*H04N 23/661*    (2023.01)
*G01C 17/00*    (2006.01)
*G06V 20/50*    (2022.01)
*H04N 7/18*    (2006.01)
*H04N 23/695*    (2023.01)

(52) U.S. Cl.
CPC ........... *H04N 23/662* (2023.01); *G01C 17/00* (2013.01); *G06V 20/50* (2022.01); *H04N 7/181* (2013.01); *H04N 23/695* (2023.01); *G06V 2201/10* (2022.01)

(58) Field of Classification Search
CPC .... H04N 23/662; H04N 7/181; H04N 23/695; H04N 5/272; G01C 17/00; G06V 20/50; G06V 2201/10
See application file for complete search history.

(56) References Cited

U.S. PATENT DOCUMENTS

| 9,678,654 | B2 | 6/2017 | Wong |
| 2019/0391716 | A1* | 12/2019 | Badr ..................... G06F 3/0482 |
| 2021/0152731 | A1* | 5/2021 | Wakamatsu ........... H04N 23/61 |

FOREIGN PATENT DOCUMENTS

| EP | 3226567 A1 | 10/2017 |
| JP | 2012-119971 A | 6/2012 |

(Continued)

OTHER PUBLICATIONS

Nguyen, A. et al., "Low-Cost Augmented Reality Prototype for controlling network devices" XP055483525, https://arxiv.org/pdf/1406.3117.pdf, Jun. 12, 2014, pp. 1-4.

(Continued)

*Primary Examiner* — Christopher K Peterson
(74) *Attorney, Agent, or Firm* — Carter, DeLuca & Farrell LLP

(57) ABSTRACT

A control apparatus having an image capturing unit and configured to operate as a master device that controls a slave device, comprises: at least one processor causing the control apparatus to act as: a registration unit configured to register slave device information of a slave device to be controlled by the control apparatus; and an identification unit configured to, based on the slave device information registered by the registration unit, identify a slave device that exists in a range of image capturing by the image capturing unit. The registration unit registers, as the slave device information, information on a relative direction of existence of a slave device with respect to a position of the image capturing unit.

13 Claims, 10 Drawing Sheets

(56) References Cited

FOREIGN PATENT DOCUMENTS

| | | | |
|---|---|---|---|
| KR | 102211014 B1 | 2/2021 | |
| WO | 2020005575 A1 | 1/2020 | |
| WO | PCT/JP2019/028934 | * 2/2020 | ............. G03B 15/00 |

OTHER PUBLICATIONS

Supplementary European Search Report issued in corresponding EP Patent Application No. 22169898.8, dated Oct. 14, 2022, pp. 1-10.

* cited by examiner

FIG. 2A
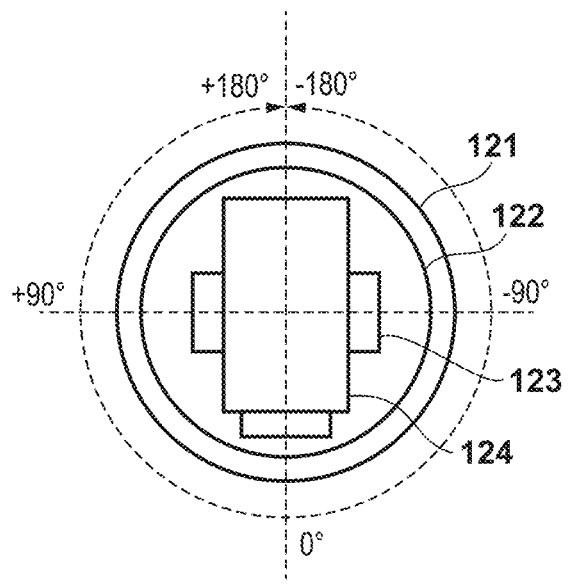
FIG. 2B
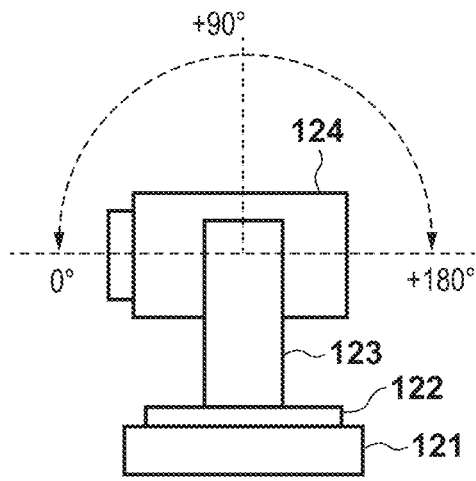
FIG. 3
| ID | DEVICE NAME | TYPE | PAN, TILT |
|---|---|---|---|
| 1 | ○○ | BAROMETER | 300,15 |
| 2 | ▲▲ | HUMAN DETECTION SENSOR | 200,30 |
| . | ×× | . | . |
| 9 | ○○ | THERMOMETER | 45,45 |
| . | . | . | . |
| N-1 | ▲▲ | ILLUMINANCE SENSOR | 80,60 |
| N | ×× | HYGROMETER | 100,70 | ns of the invention and, together with the description, serve to explain the principles of the invention.

FIG. 1 is a diagram illustrating an overall configuration of a system in a first embodiment.

FIGS. 2A and 2B are diagrams illustrating a mechanical configuration of a network camera.

FIG. 3 is a diagram illustrating an example of registered information of wireless communication slave devices.

FIG. 4 is a diagram illustrating an example of PT coordinates and a positional relationship with a wireless communication slave device.

FIG. 5 is an operation flowchart of the network camera according to the first embodiment.

FIG. 6 is a diagram illustrating an example of a captured image.

FIG. 7 is a detailed flowchart of the process of identifying a slave device (step S802).

FIG. 8 is a diagram illustrating an example of displaying slave device information in a camera image.

FIG. 9 is a diagram illustrating an overall configuration of the system in a second embodiment.

FIG. 10 is a diagram illustrating an example of registered information of wireless communication slave devices.

FIG. 11 is an operation flowchart of the network camera according to the second embodiment.

FIG. 12 is a diagram illustrating an example of a captured image.

FIG. 13 is a detailed flowchart of the process of identifying a slave device (step S1302).

CONTROL APPARATUS AND METHOD OF CONTROLLING THE SAME

BACKGROUND OF THE INVENTION

Field of the Invention

The present invention relates to a technique for identifying a device included in a captured image.

Description of the Related Art

There is a system for obtaining various sensor data by combining a slave device, which is a wireless communication device for transmitting data obtained by a sensor, and a master device for collecting data. In such a system, first, the process of registering the slave device with the master device is performed. Thereafter, a user performs various settings for the slave device via the master device. The settings include, for example, the detection accuracy and units of the sensor, a sleep interval, and the name for identifying the slave device. The slave device transmits sensor data to the master device and enters sleep mode according to the settings.

Further, when the master device is an image capturing apparatus, it is desired to identify a slave device included in a captured image. For example, Japanese Patent Laid-Open No. 2012-119971 (Patent Document 1) discloses a technique for receiving information on a monitoring target from an external server and identifying the monitoring target in order to display additional information superimposed on the monitoring target in an image capturing screen.

However, in Patent Document 1, since the configuration is for receiving the information on the monitoring target from the external server, it is impossible to identify the monitoring target in the image capturing screen by the image capturing apparatus alone. Generally, the slave device information held by the master device does not include information indicating the physical positional relationship between the slave device and the master device. Therefore, when the master device is an image capturing apparatus, even when a slave device exists in the image capturing range of the master device, the master device cannot identify which of the registered slave devices that slave device is.

SUMMARY OF THE INVENTION

According to one aspect of the present invention, a control apparatus having an image capturing unit and configured to operate as a master device that controls a slave device, comprises: at least one processor causing the control apparatus to act as: a registration unit configured to register slave device information of a slave device to be controlled by the control apparatus; and an identification unit configured to, based on the slave device information registered by the registration unit, identify a slave device that exists in a range of image capturing by the image capturing unit, wherein the registration unit registers, as the slave device information, information on a relative direction of existence of a slave device with respect to a position of the image capturing unit.

The present invention enables identification of a slave device included in a captured image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodi-

DESCRIPTION OF THE EMBODIMENTS

Figure 1:
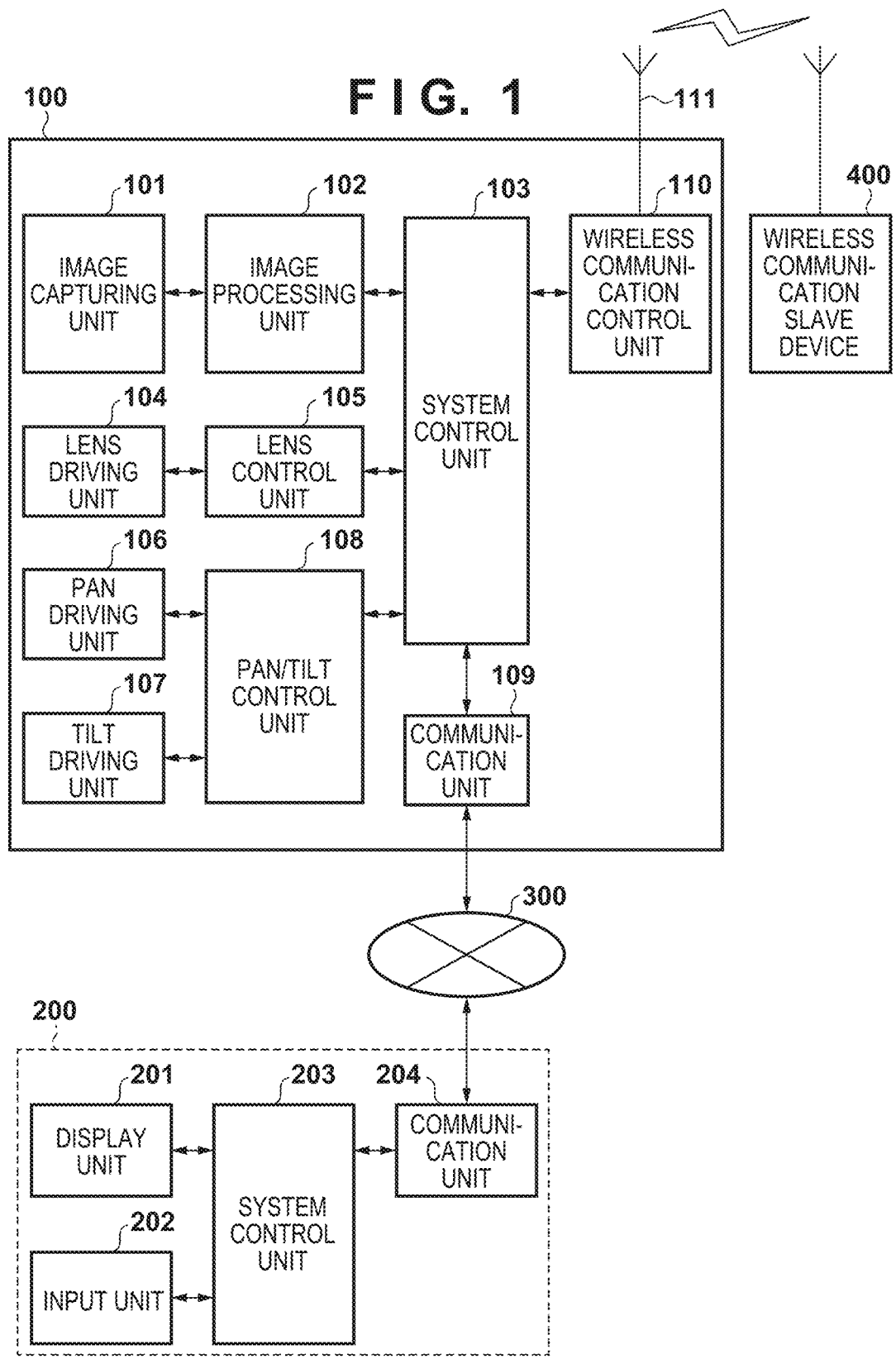

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As a first embodiment of a control apparatus according to the present invention, description will be given below using an example of an image capturing apparatus that operates as a master device for controlling a slave device.

<Functional Configuration of System and Respective Apparatuses>

FIG. 1 is a diagram illustrating an overall configuration of a system in the first embodiment. The system includes a network camera 100 and a client apparatus 200 that are connected to be capable of communication by a network 300. The system also includes a wireless communication slave device 400 that can be connected with the network camera 100 by wireless communication.

The network camera 100 is an apparatus that receives control from the client apparatus 200 via the network 300 and transmits an image obtained by an image capturing unit 101 to the client apparatus 200. Further, the network camera 100 is configured to be capable of controlling the wireless communication slave device 400 via wireless communication.

The image capturing unit 101 receives, in an image capturing element, the light that has been formed into an image through a lens, converts the received light into electric charge, and thereby generates an image capturing signal. As the image capturing element, a CMOS (Complementary Metal Oxide Semiconductor) image sensor, for example, can be used. Further, as the image capturing element, a CCD (Charge Coupled Device) image sensor may be used.

An image processing unit 102 generates image data by digitizing the image capturing signals converted by the image capturing unit 101. At this time, the image processing unit 102 also performs a variety of image processing to correct image quality. The image processing unit 102 may further generate compressed and encoded image data by compressing and encoding image data.

A lens control unit 105 controls a lens driving unit 104 based on instructions from a system control unit 103. The lens driving unit 104 is configured by a driving system of a focus lens and a zoom lens and a motor of the driving source of the driving system, and the operation thereof is controlled by the lens control unit 105.

A pan driving unit 106 is configured by a mechanical driving system for performing a pan operation, a motor of the driving source thereof, and an angle sensor for detecting an angle of the driving unit. A tilt driving unit 107 is configured by a mechanical driving system for performing a tilt operation, a motor of the driving source thereof, and an angle sensor for detecting an angle of the driving unit. The operation of the pan driving unit 106 and the tilt driving unit 107 is controlled by a pan/tilt control unit 108. The pan/tilt control unit 108 controls the driving of the pan driving unit 106 and the tilt driving unit 107 based on instructions from the system control unit 103.

A communication unit 109 is a functional unit that communicates with the client apparatus 200. For example, the communication unit 109 transmits, to the client apparatus 200, a video stream based on the image data generated by the image processing unit 102. Here, the image data is, as an example, frame image data comprising a moving image. Further, the communication unit 109 receives commands transmitted from the client apparatus 200 and transmits the commands to the system control unit 103. The responses to the commands are transmitted to the client apparatus 200 in accordance with the control of the system control unit 103. As described above, the system control unit 103 also functions as a communication control unit.

The wireless communication control unit 110 transmits and receives data, control commands, and the like in accordance with a wireless communication standard. Specifically, radio waves, which are data, control commands, and the like that have been modulated and demodulated, are transmitted and received via the antenna 111. As the wireless communication standard, it is possible to use a wireless LAN (Wi-Fi®), Bluetooth®, ZigBee, Z-Wave, or the like.

The system control unit 103 is a functional unit for comprehensively controlling each unit of the network camera 100. For example, the system control unit 103 analyzes a command that the communication unit 109 received from the client apparatus 200 via the network 300 and performs processing according to the command. For example, it may give the image processing unit 102 an instruction for adjusting image quality to or the lens control unit 105 an instruction for zooming or focus control. Further, although details will be described later, the system control unit 103 performs exchange of data, control commands, and the like with the wireless communication slave device 400 through the wireless communication control unit 110 and performs processing (slave device control), such as obtaining information from and setting the wireless communication slave device 400.

The system control unit 103 may be provided inside the network camera 100 or may be configured independently of the network camera 100. When the system control unit 103 is an apparatus external to the network camera 100, configuration may be taken such that the system control unit 103 is capable of communicating with the network camera 100.

The client apparatus 200 is an apparatus that receives operations from the user and controls the network camera 100. The client apparatus 200 can be realized using a computer such as a personal computer.

A display unit 201 displays a graphical user interface (GUI) for performing control of the network camera 100. Further, the display unit 201 displays images based on the image data received from the network camera 100. The display unit 201 can be realized by a display device using a liquid crystal panel, an organic EL panel, or the like.

An input unit 202 is any device such as a keyboard or a mouse that accepts operations from the user. The user performs operations on the GUI via the input unit 202. The input unit 202 may be realized using other devices such as a touch panel or a joystick.

The communication unit 204 communicates with the network camera 100 via the network 300. For example, image data can be obtained from the network camera 100 by transmitting a command corresponding to an operation by the user to the network camera 100.

A system control unit 203 is a functional unit for comprehensively controlling each unit of the client apparatus 200. For example, the system control unit 203 generates a command in response to an operation by the user and transmits the command from the communication unit 204 to the network camera 100. Further, the system control unit 203 also displays, on the display unit 201, the image data from the network camera 100 received via the communication unit 204. As described above, the system control unit 203 also functions as a communication control unit and a display control unit.

A wireless communication slave device 400 is, for example, a slave device having a sensor function and transmits the data obtained by the sensor to the network camera 100, which operates as a master device. The wireless communication slave device 400 is driven by, for example, a battery; when the battery is mounted and the device is activated, the wireless communication slave device 400 performs the process of registering with the master device; and, when communication from the master device is not performed for a predefined period of communication timeout, the wireless communication slave device 400 enters a sleep state in which functions are limited.

The process of registering the wireless communication slave device 400 with the master device may be performed at times other than when the wireless communication slave device 400 is activated by the battery being mounted. For example, configuration may be taken such that a button is added to the wireless communication slave device 400 and the registration process is started at the press of the button. Furthermore, although a slave device has been described here as the wireless communication slave device 400 that performs wireless communication, it may be a slave device connected by cable.

<Mechanical Configuration of Network Camera>

FIGS. 2A and 2B are diagrams illustrating a mechanical configuration of the network camera 100. The network camera 100 is configured by a bottom case 121, a turntable 122, a camera head strut 123, and a camera head 124. FIG. 2A is a diagram of the network camera 100 mounted on a table seen from above, and FIG. 2B is a diagram of the network camera 100 seen from the side.

Referring to FIGS. 2A and 2B, the operation of pan/tilt movable portions will be described with an axis in the vertical direction set as the vertical axis and an axis perpendicular to this defined as the horizontal axis. In FIG. 2A, a clockwise direction around the vertical axis perpendicular to the sheet surface is set as the positive direction of the pan angle. In addition, in FIG. 2B, a clockwise direction around the axis perpendicular to the sheet surface is set as the positive direction of the tilt angle.

In FIGS. 2A and 2B, the pan driving unit 106 of FIG. 1 is configured by the bottom case 121 and the turntable 122, and the turntable 122 is capable of being rotated around the vertical axis. Electrical circuits configured in a fixed portion of the bottom case 121 and a rotating portion of the turntable 122 are connected by a slip ring or the like. Therefore, the pan movable portion can be rotated freely (endlessly in an angular range of 360°) with the vertical axis as the rotation axis.

In addition, in FIGS. 2A and 2B, the tilt driving unit 107 of FIG. 1 is configured by the camera head strut 123 and the camera head 124, and the camera head 124 is capable of being rotated around the horizontal axis. Here, the tilt movable portion can be rotated in an angular range of 180° with the horizontal axis as the rotation axis.

As described above, the network camera of the present embodiment can capture images in a wide range by changing the image capturing direction by rotating the camera head in the pan direction and the tilt direction. The network camera 100 is not limited to the configuration illustrated in FIGS. 2A and 2B. For example, for the pan direction, the drivable range may be limited (e.g., +170° to −170° or the like) instead of being capable of being driven 360°. In addition, for the tilt direction, the driving range may be limited (e.g., 0° to 90° or the like) instead of being capable of being driven 180°.

<System Operation>

The operation of the system roughly includes an operation in which the network camera registers the information of the wireless communication slave device and an operation in which the network camera controls the wireless communication slave device based on the registered information. Description will be given in order below.

<Registration of Wireless Communication Slave Devices by Network Camera>

FIG. 3 is a diagram illustrating an example of registered information of wireless communication slave devices. It illustrates the information registered in the network camera 100 in the process of registering the wireless communication slave device 400 with the master device (network camera 100) described above.

An information table 500 indicates a state in which information of N wireless communication slave devices is registered and held as a table. The information table 500, for example, is managed by the system control unit 103 of the network camera 100.

The information table 500 includes an ID 501, a device name 502, a device type 503, and pan and tilt (PT) coordinates 504 for each wireless communication slave device. The PT coordinates 504 indicate the coordinates for defining the direction of the wireless communication slave device based on the coordinate system illustrated in FIGS. 2A and 2B with respect to the position at which the network camera 100 is installed.

Specifically, when performing the process of registering a wireless communication slave device, which is a control target, with the network camera 100, the network camera 100 is caused in advance to face toward the wireless communication slave device to be registered. That is, the wireless communication slave device to be registered is made to be approximately in the center of the image capturing range of the image capturing unit 101. Then, the registration process is started, and the coordinates of the pan driving unit 106 and the tilt driving unit 107 of the network camera 100 are registered as the PT coordinates 504. That is, the information on the relative direction of existence of the slave device with respect to the position of the network camera 100 (or the image capturing unit 101) is registered.

Figure 4:
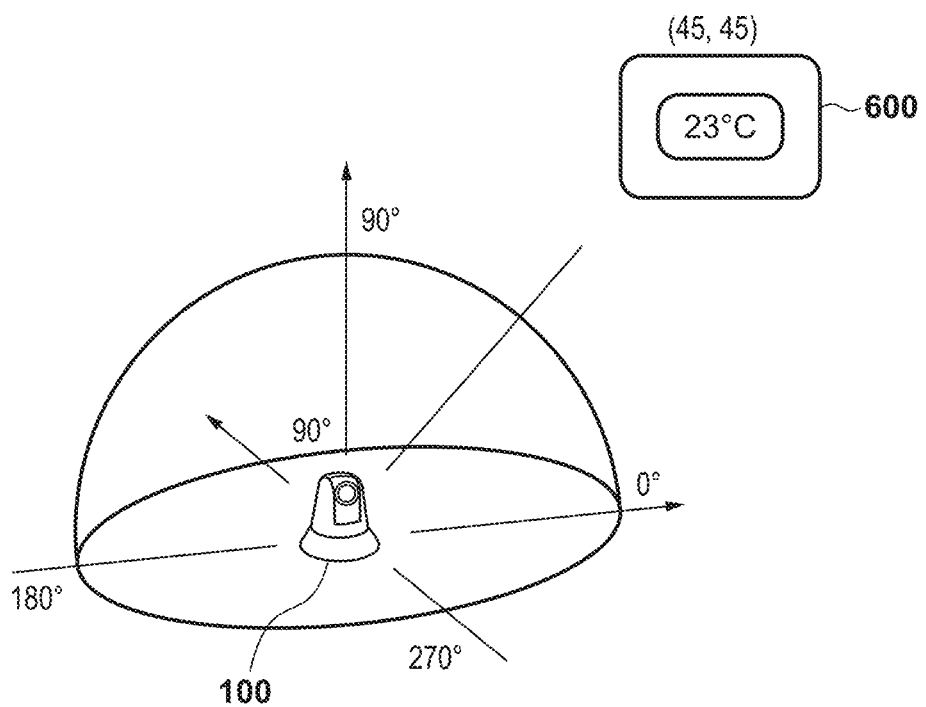

FIG. 4 is a diagram illustrating an example of PT coordinates and a positional relationship with a wireless communication slave device. Here, a state in which a thermometer, which is a wireless communication slave device, is in a direction (at a position) for which the PT coordinates of the network camera 100 are (45, 45) is illustrated.

First, before the process of registering the wireless communication slave device (thermometer) is performed (e.g., before mounting a battery to the thermometer), the network camera 100 is made to face toward the wireless communication slave device. Then, by mounting a battery to the thermometer, the process of registering the wireless communication slave device (thermometer) is performed, and the PT coordinates (45, 45) of the network camera 100 at that time are registered. By this, as illustrated in FIG. 3, the wireless communication slave device (thermometer) whose ID=9 is registered in the information table 500.

<Control of Wireless Communication Slave Devices by Network Camera>

Figure 5:
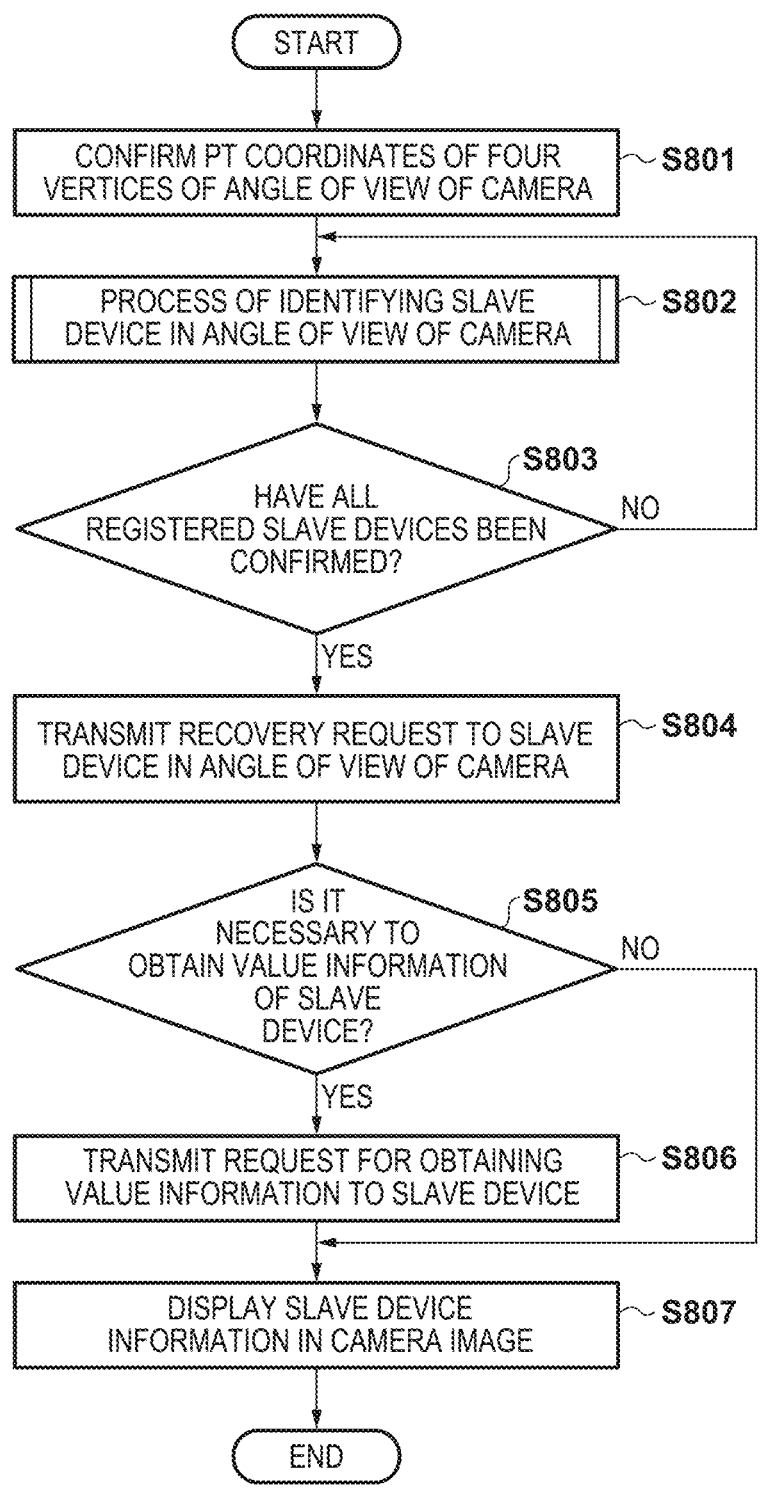

FIG. 5 is an operation flowchart of the network camera according to the first embodiment. The operation flow illustrated in FIG. 5 is executed when a pan, tilt, and zoom (PTZ) operation is performed for the network camera 100. It may be executed every time a PTZ operation is stopped in the middle of a series of PTZ operations being performed. Further, it may be executed after a predetermined period has elapsed from when a PTZ operation is stopped (i.e., after a series of PTZ operations has been completed).

In step S801, the system control unit 103 confirms the pan/tilt (PT) coordinates of the four vertices of the image capturing range (angle of view for image capturing). This is calculated, for example, by the PT coordinates and the zoom (Z) value of the network camera 100 at that time.

Figure 6:
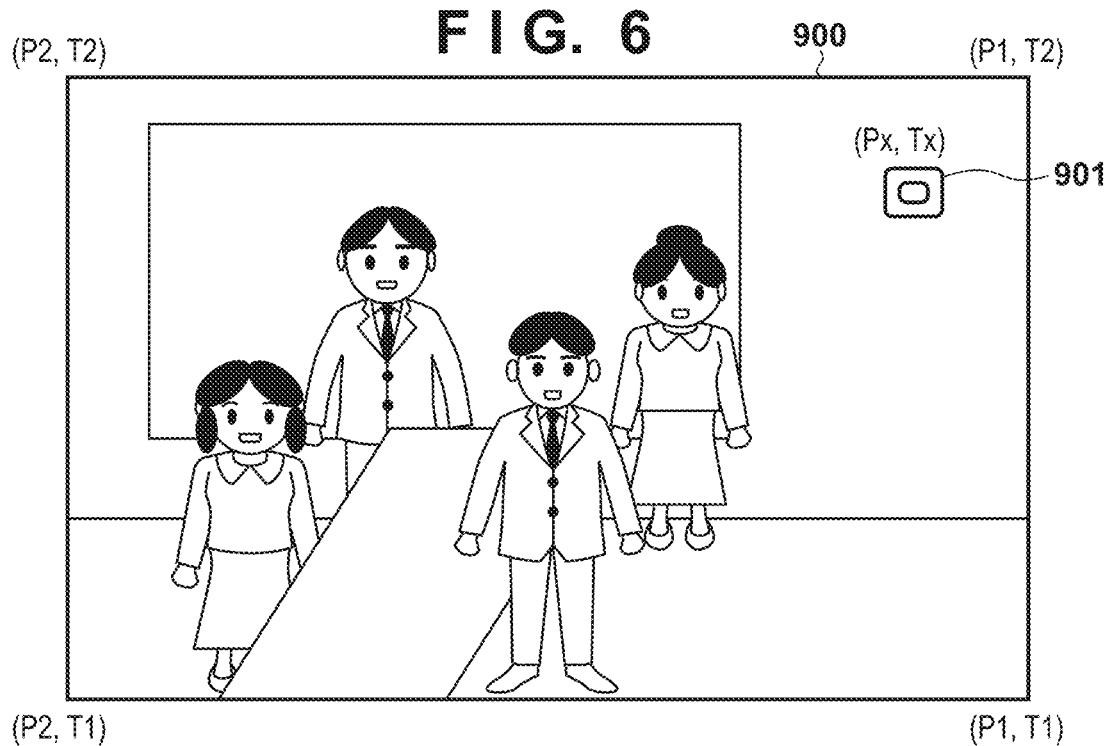

FIG. 6 is a diagram illustrating an example of a captured image 900 captured by a network camera. The captured image 900 includes a wireless communication slave device 901. However, at the time of step S801, the network camera 100 has not yet recognized that the captured image 900 includes the wireless communication slave device 901. In step S801, the system control unit 103 confirms the PT coordinates (P2, T2), (P1, T2), (P2, T1), and (P1, T1) of the four vertices of the captured image 900.

In step S802, the system control unit 103 performs the process of identifying the slave device that is in the image capturing range. In step S803, the system control unit 103 determines whether or not the process in step S802 has been performed for all the slave devices registered in the information table 500. If the process in step S802 has been performed for all registered slave devices, the process proceeds to step S804, and if there still are slave devices for which the process in step S802 has not been performed, the process proceeds to step S802. That is, the process in step S802 is repeatedly performed until it is performed for all the slave devices registered in the information table 500.

Figure 7:
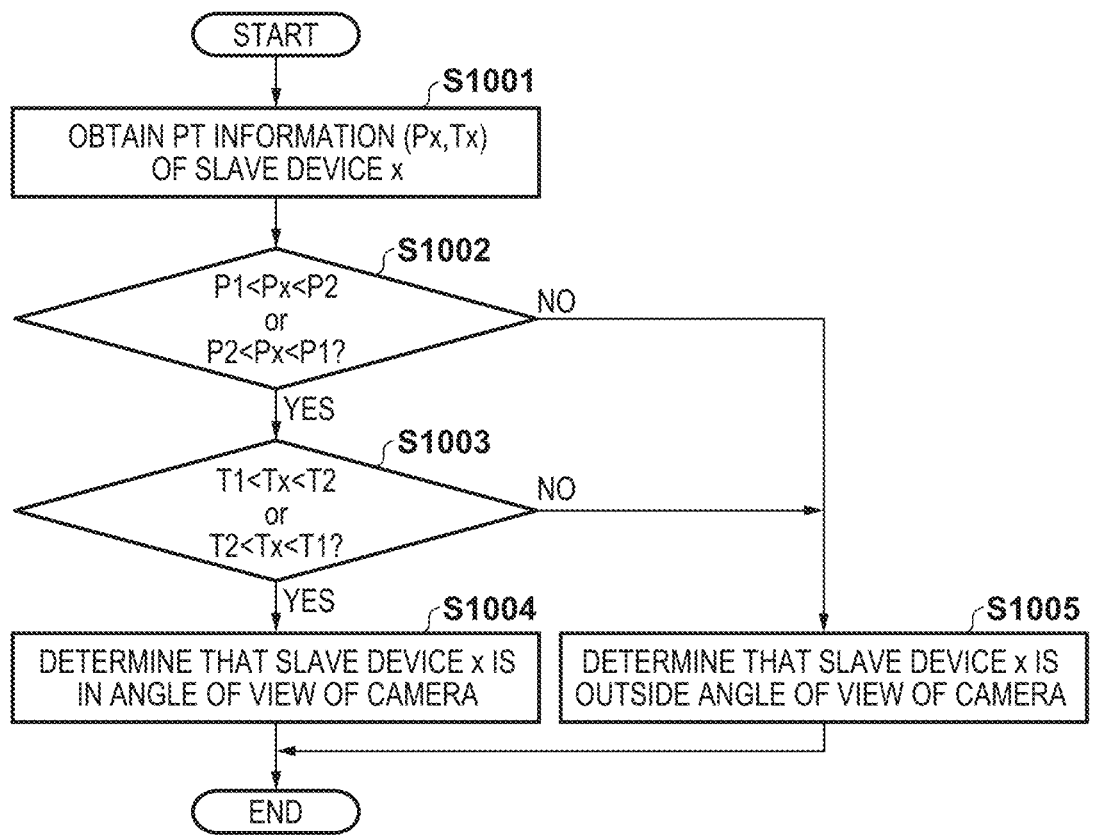

FIG. 7 is a detailed flowchart of the process of identifying a slave device (step S802). Description will be given below assuming that the process is performed for a slave device x (x is 1 to N).

In step S1001, the system control unit 103 obtains the PT coordinates (Px, Tx) of the slave device x from the information table 500. That is, it reads the PT coordinates 504 corresponding to the slave device x from the information table 500.

In step S1002, the system control unit 103 confirms whether or not Px is included in the pan range (i.e., between P1 and P2) confirmed in step S801. If Px is included between P1 and P2, the process proceeds to step S1003; if it is not included, the process proceeds to step S1005. In general, whether or not Px is included between P1 and P2 is confirmed by comparing Px with the respective values of P1 and P2. However, if the image capturing range is such that it straddles 0°, such as an angle, determination is made taking that into account.

In step S1003, the system control unit 103 confirms whether or not Tx is included in the tilt range (i.e., between T1 and T2) confirmed in step S801. If Tx is included between T1 and T2, the process proceeds to step S1004; if it is not included, the process proceeds to step S1005. In general, whether or not Tx is included between T1 and T2 is confirmed by comparing Tx with the respective values of T1 and T2. However, if the image capturing range is such that it straddles 0°, such as an angle, determination is made taking that into account.

In step S1004, the system control unit 103 determines that the slave device x is in the image capturing range. Meanwhile, in step S1005, the system control unit 103 determines that the slave device x is not in the image capturing range.

As described above, by comparing the PT coordinates of the slave device registered in advance in the information table 500 with the PT coordinates of the four vertices of the image capturing range, it is identified whether or not the slave device exists in the current image capturing range.

In step S804, the system control unit 103 transmits a recovery request to the slave device that has been determined to be in the image capturing range in step S802. For example, the system control unit 103 generates a recovery request and transmits it via the wireless communication control unit 110 and the antenna 111. As an additional process in step S804, among the slave devices that have been determined to be outside the image capturing range in step S802, a request for transitioning to sleep may be transmitted to the slave devices that are not in the sleep state.

In step S805, the system control unit 103 determines whether or not it is necessary to obtain value information from the slave device to which the recovery request has been transmitted in step S804. For example, if the slave device is a thermometer, since the device is mainly for obtaining temperature information, it is determined that it is necessary to obtain a value. Meanwhile, when the device is mainly for taking action, such as a door lock, it is determined that it is not necessary to obtain a value. When it is necessary to obtain value information, the process proceeds to step S806, and when it is not necessary to obtain value information, the process proceeds to step S807.

In step S806, the system control unit 103 transmits a request for obtaining value information to the slave device. For example, the system control unit 103 generates a request for obtaining value information and transmits it via the wireless communication control unit 110 and the antenna 111.

In step S807, the system control unit 103 controls to display slave device information in the camera image. For example, an image in which the information stored in the information table 500 is displayed such that the information is superimposed on the position of the slave device in the camera image is generated and outputted to the client apparatus 200. In addition, the information (e.g., the temperature value) obtained by the slave device responding to the request for obtaining value information transmitted in step S806 may be displayed superimposed on the position of the slave device in the camera image.

Figure 8:
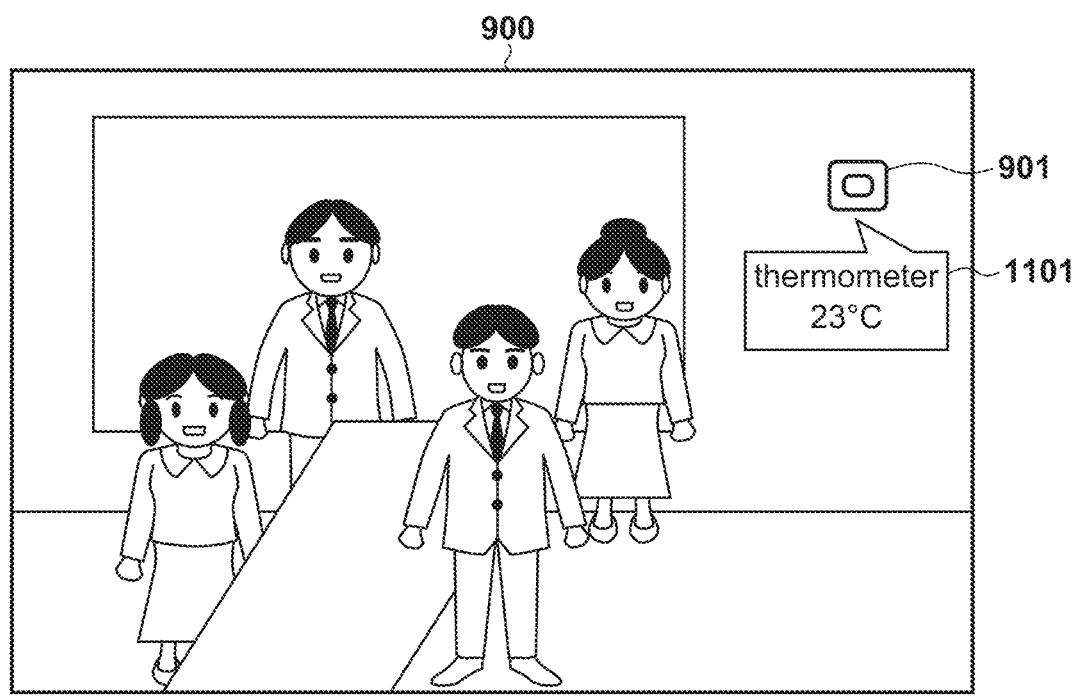

FIG. 8 is a diagram illustrating an example of displaying slave device information in a camera image. The camera image is generated by the network camera 100, is outputted to the client apparatus 200, and then is displayed on the display unit 201.

In the camera image illustrated in FIG. 8, an information display 1101 is displayed superimposed on the captured image 900 illustrated in FIG. 6. Here, since the slave device 901 is a thermometer, the information display 1101 is a temperature value. In the above description, it is assumed that, in step S807, the network camera 100 generates a camera image in which the slave device information is displayed superimposed. However, configuration may be such that the slave device information is distributed as metadata of the camera image and an image in which the slave device information is displayed superimposed is generated in the client apparatus 200. Further, as the information display 1101, another information (e.g., remaining battery power) of the slave device may be displayed. Further, for a device that mainly takes action, such as a door lock, the state of the door lock or the like may be displayed as the information display 1101.

As described above, according to the first embodiment, the network camera 100 can identify the slave device included in the captured image by using the pan and tilt (PT) coordinates of the slave device that has been registered in advance. This makes it possible to display the information on the slave device superimposed on the captured image. Furthermore, it is possible to selectively recover (deactivate sleep for) the slave device included in the captured image as well as additionally display information obtained from the slave device as the information of the slave device.

In the above description, the network camera has been given as an example, but the present invention can also be applied to cameras for other purposes. For example, the present invention can also be applied to an image capturing apparatus for capturing images or movies for broadcasting purposes or images for personal purposes.

Second Embodiment

In a second embodiment, description will be given for an embodiment for identifying a slave device that exists in a captured image using information on the direction of an image capturing unit (lens) of an image capturing apparatus. That is, information on the direction of the image capturing unit is used instead of the pan and tilt (PT) coordinates in the first embodiment described above. Thus, for example, even when the image capturing apparatus does not have a configuration for pan and tilt control or cannot obtain the pan and tilt coordinates, it is possible to identify the slave device in the captured image.

<Functional Configuration of System and Respective Apparatuses>

Figure 9:
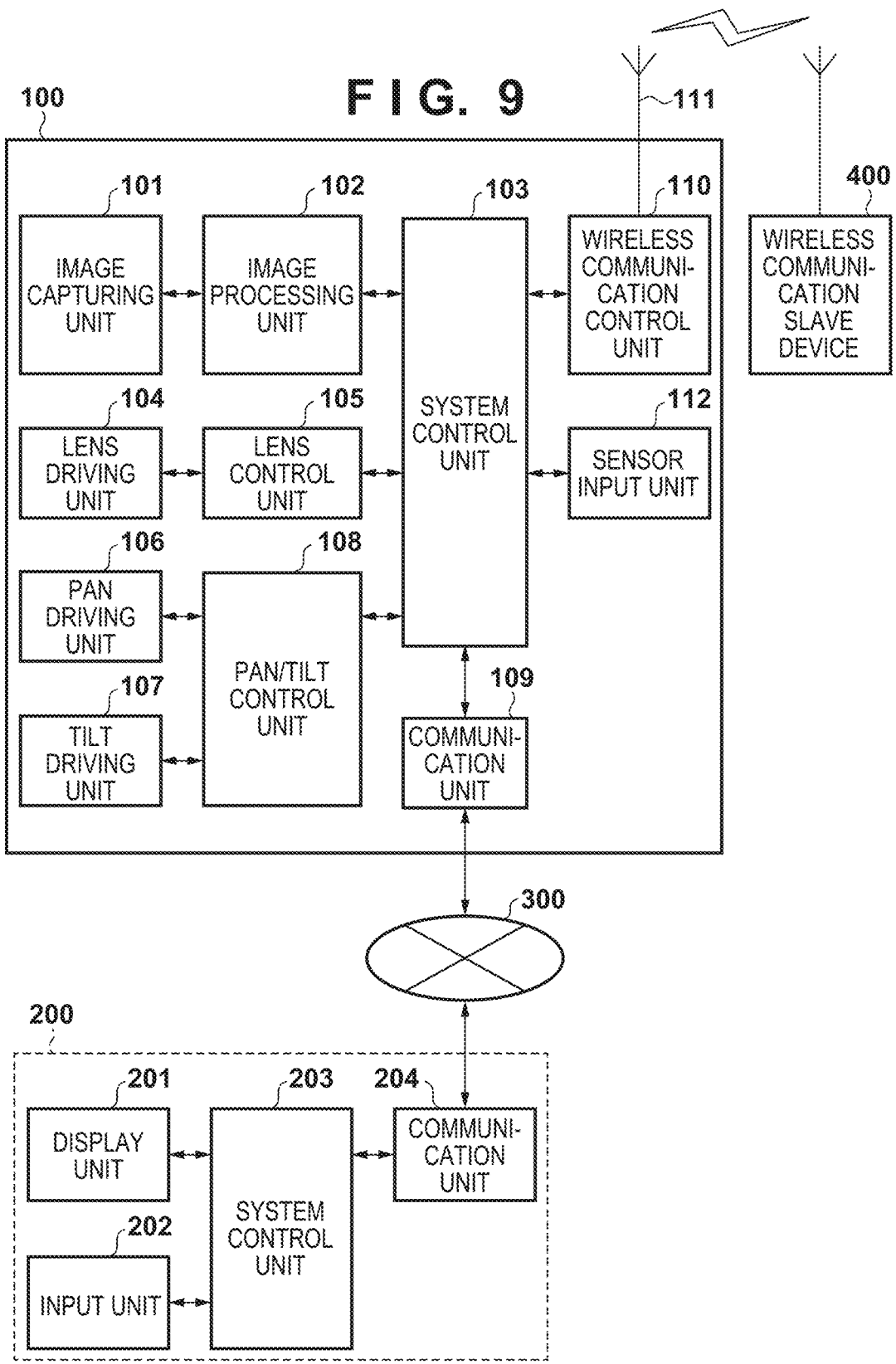

FIG. 9 is a diagram illustrating an overall configuration of the system in the second embodiment. Similarly to the first embodiment, the system includes the network camera 100 and the client apparatus 200 that are connected to be capable of communication by the network 300. The system also includes a wireless communication slave device 400 that can be connected with the network camera 100 by wireless communication.

In the second embodiment, the network camera 100 differs from the first embodiment in that it further includes a sensor input unit 112. The sensor input unit 112 obtains the position and orientation of the network camera 100 from a sensor device, such as an encoder for detecting a change in a mechanical position or an electronic compass for obtaining position and orientation by detecting magnetism. The sensor device may be integrated in the camera or external and capable of connecting to an external interface such as a USB. Description will be omitted for other components since they are the same as the first embodiment.

<System Operation>

The operation of the system roughly includes an operation in which the network camera registers the information of the wireless communication slave device and an operation in which the network camera controls the wireless communication slave device based on the registered information. Description will be given in order below. Description will be given for portions that are different from the first embodiment, and description will be omitted for portions that are the same as the first embodiment.

<Registration of Wireless Communication Slave Devices by Network Camera>

Figure 10:
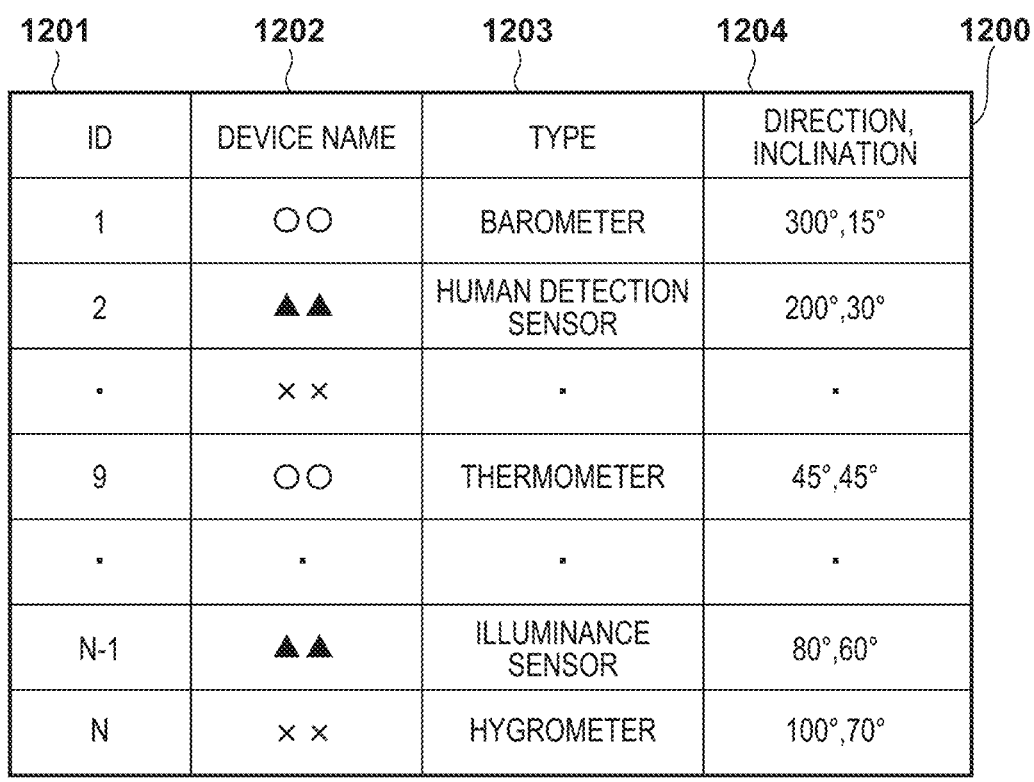

FIG. 10 is a diagram illustrating an example of registered information of wireless communication slave devices. An information table 1200 indicates a state in which information of N wireless communication slave devices is registered and held as a table. The information table 1200, for example, is managed by the system control unit 103 of the network camera 100.

The information table 1200 includes an ID 1201, a device name 1202, a device type 1203, and direction and inclination values 1204 for each wireless communication slave device. The direction and inclination values 1204 indicate values defining the direction of the slave device with respect to the position of the network camera 100. The direction and inclination values 1204 are values corresponding to the "direction in which the image capturing unit (lens) is facing" calculated based on the position and orientation of the network camera 100 obtained from the sensor input unit 112.

Specifically, when performing the process of registering a wireless communication slave device with the network camera 100, the network camera 100 is made in advance to face toward the wireless communication slave device. That is, the wireless communication slave device is made to be in the center of the image capturing range of the image capturing unit 101. Then, the registration process is started, and the "direction in which the image capturing unit (lens)" of the network camera 100 "is facing" is registered as the direction and inclination values 1204. Here, it is assumed that the direction and inclination values 1204 are the "direction in which the image capturing unit (lens) is facing" calculated based on the position and orientation of the network camera 100 obtained from the sensor input unit 112. However, a method of storing values obtained from the sensor input unit 112 as is may be used. In that case, in step S1301 to be described later, "the direction in which the image capturing unit (lens) is facing" is calculated.

<Control of Wireless Communication Slave Devices by Network Camera>

Figure 11:
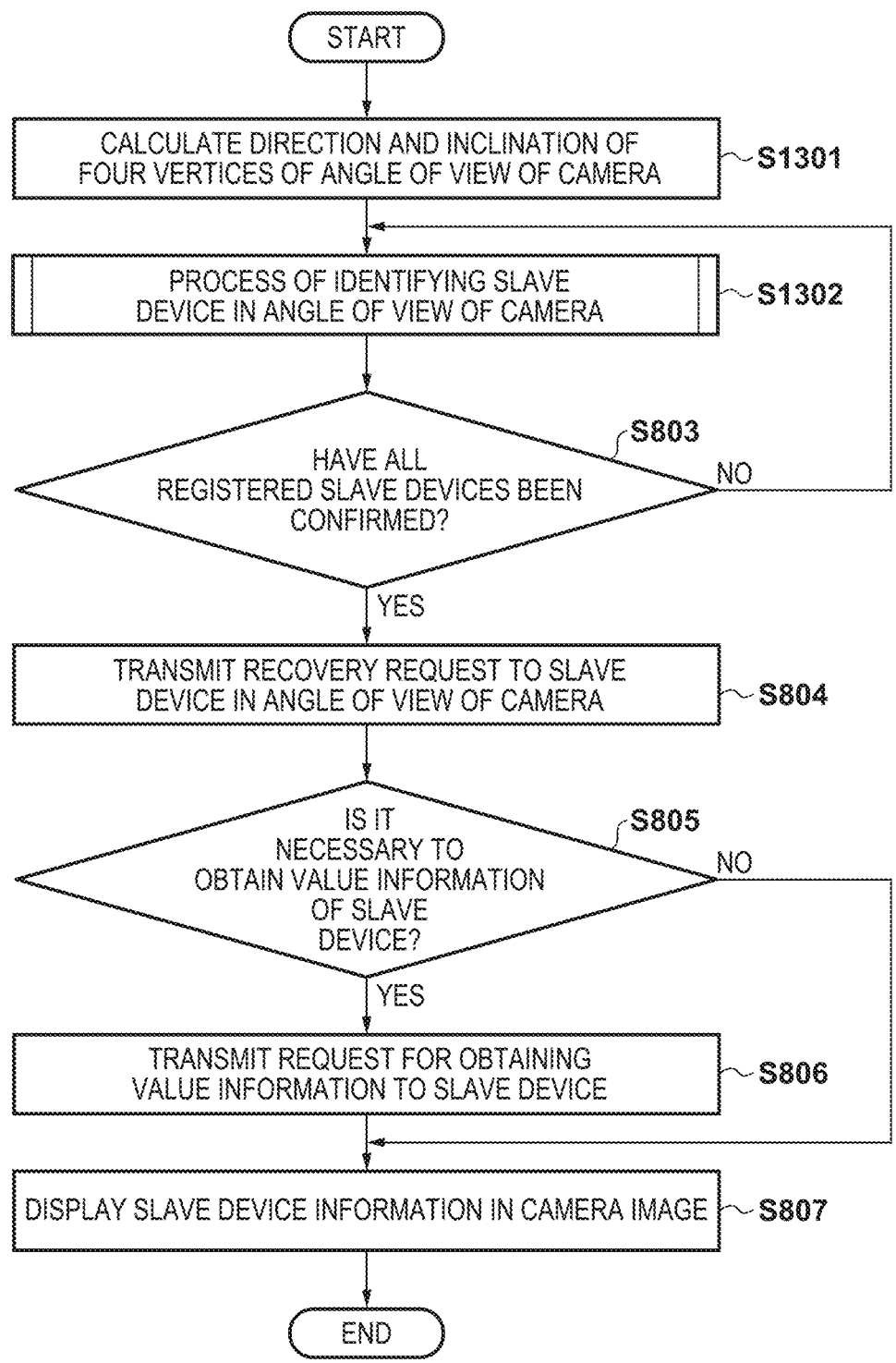

FIG. 11 is an operation flowchart of the network camera according to the second embodiment. The operation flow illustrated in FIG. 11 is executed when the position and orientation or zoom of the network camera 100 is changed (a PTZ operation is performed). It may be executed every time a PTZ operation is stopped in the middle of a series of PTZ operations being performed. Further, it may be executed after a predetermined period has elapsed from when a PTZ operation is stopped (i.e., after a series of PTZ operations has been completed). Steps S1301 and S1302 differ from the first embodiment (FIG. 5). Description will be omitted for steps S803 to S807 since they are the same as the first embodiment.

In step S1301, the system control unit 103 calculates the direction and inclination of the four vertices of the image capturing range (angle of view for image capturing). This is, for example, calculated by calculating the direction and inclination values, which are the "direction in which the image capturing unit (lens) is facing", from the value of the sensor input unit 112 at that time, taking the information on the horizontal angle of view and the vertical angle of view, which are calculated from a zoom setting value, into account.

Figure 12:
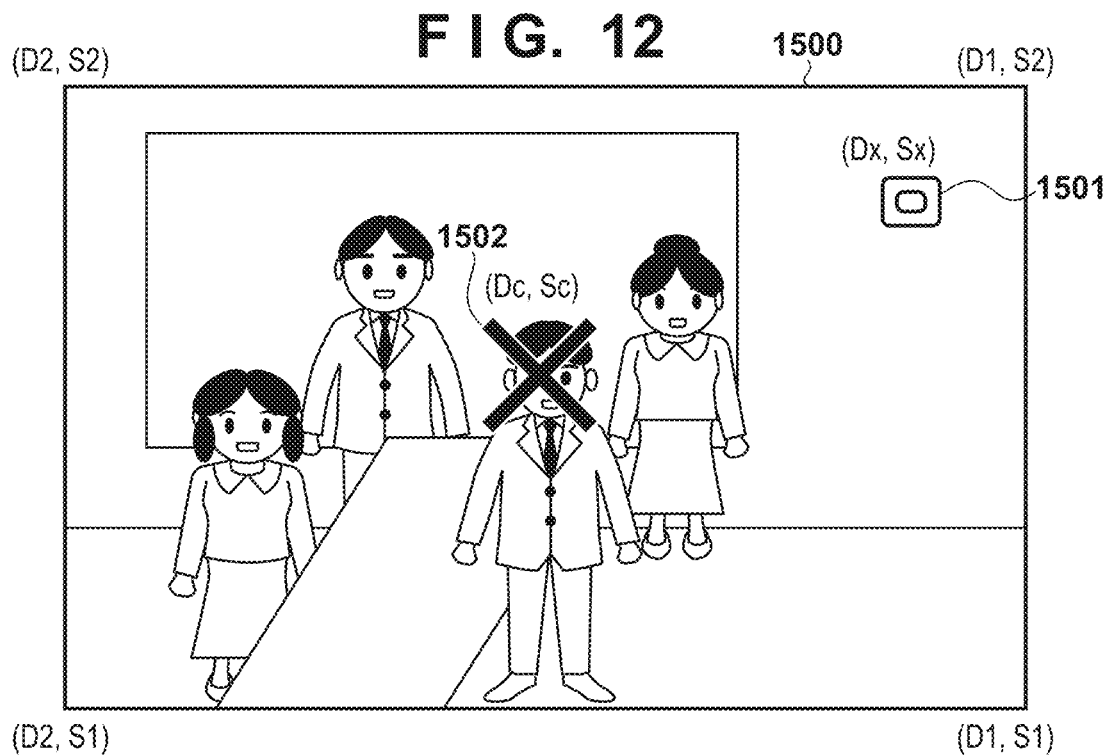

FIG. 12 is a diagram illustrating an example of a captured image 1500 captured by a network camera. The captured image 1500 includes a wireless communication slave device 1501. However, at the time of step S1301, the network camera 100 has not yet recognized that the captured image 1500 includes the wireless communication slave device 1501. In step S1301, the system control unit 103 confirms the direction values and the inclination values, (D2, S2), (D1, S2), (D2, S1), and (D1, S1), of the four vertices of the captured image 1500.

For example, D1, D2, S1, and S2 are calculated by the following equation using the direction value Dc and the inclination value Sc of the lens corresponding to approximately the center 1502 of the image capturing range.

$D1 = Dc - \text{Horizontal Angle of View}/2$ $D2 = Dc + \text{Horizontal Angle of View}/2$ $S1 = Sc - \text{Vertical Angle of View}/2$ $S2 = Sc + \text{Vertical Angle of View}/2$ In step S1302, the system control unit 103 performs the process of identifying a slave device that is in the image capturing range. In step S803, the system control unit 103 determines whether or not the process in step S1302 has been performed for all the slave devices registered in the information table 1200. If the process in step S1302 has been performed for all registered slave devices, the process proceeds to step S804, and if there still are slave devices for which the process in step S1302 has not been performed, the process proceeds to step S1302. That is, the process in step S1302 is repeatedly performed until it is performed for all the slave devices registered in the information table 1200.

Figure 13:
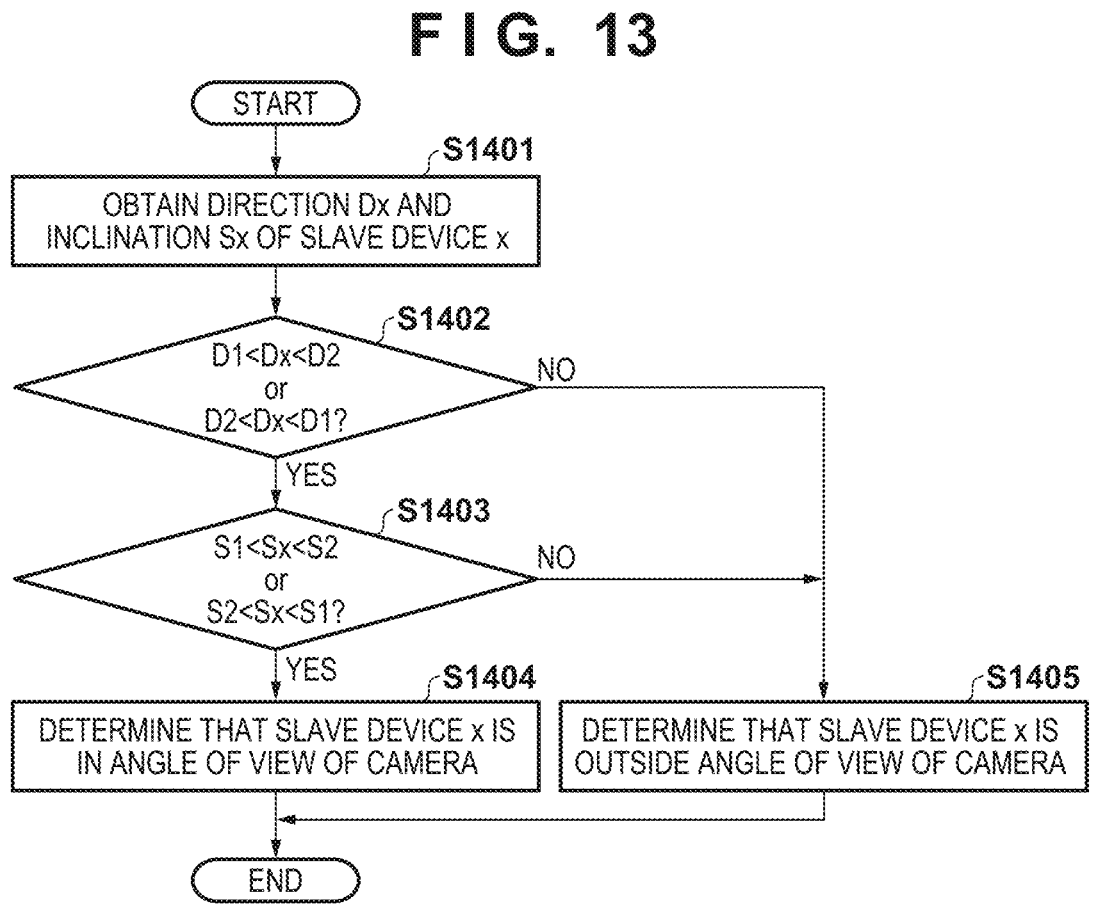

FIG. 13 is a detailed flowchart of the process of identifying a slave device (step S1302). Description will be given below assuming that the process is performed for a slave device x (x is 1 to N).

In step S1401, the system control unit 103 obtains the direction and inclination values (Dx, Sx) of the slave device x from the information table 1200. That is, it reads the direction and inclination values 1204 corresponding to the slave device x from the information table 1200.

In step S1402, the system control unit 103 confirms whether or not Dx is included in the range of direction values (i.e., between D1 and D2) confirmed in step S1301. If Dx is included between D1 and D2, the process proceeds to step S1403; if it is not included, the process proceeds to step S1405.

In step S1403, the system control unit 103 confirms whether or not Sx is included in the range of inclination values (i.e., between S1 and S2) confirmed in step S1301. If Sx is included between S1 and S2, the process proceeds to step S1404; if it is not included, the process proceeds to step S1405.

In step S1404, the system control unit 103 determines that the slave device x is in the image capturing range. Meanwhile, in step S1405, the system control unit 103 determines that the slave device x is not in the image capturing range.

As described above, by comparing the direction and inclination values of the slave device registered in advance in the information table 1200 with the direction and inclination values of the four vertices of the image capturing range, it is identified whether or not the slave device exists in the current image capturing range.

As described above, according to the second embodiment, the network camera 100 can identify the slave device included in the captured image by using the direction and inclination values of the slave device that has been registered in advance. This makes it possible to display the information on the slave device superimposed on the captured image. Furthermore, it is possible to selectively deactivate sleep for the slave device included in the captured image as well as additionally display information obtained from the slave device as the information of the slave device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-084817, filed May 19, 2021 which is hereby incorporated by reference herein in its entirety.

What is claimed is:

1. A control apparatus having an image capturing unit and configured to operate as a master device that controls a slave device, comprising:
    at least one processor causing the control apparatus to act as:
        a registration unit configured to register slave device information of a slave device to be controlled by the control apparatus;
        a slave device control unit configured to perform control of a slave device; and
        an identification unit configured to, based on the slave device information registered by the registration unit, identify a first slave device that exists in a range of image capturing by the image capturing unit, wherein
    the registration unit registers, as the slave device information, information on a relative direction of existence of a slave device with respect to a position of the image capturing unit, and
    if the first slave device is identified by the identification unit, the slave device control unit transmits a recovery request to the identified first slave device.

2. The control apparatus according to claim 1, wherein
    the identification unit identifies, based on the slave device information registered by the registration unit, a second slave device that exists in outside a range of image capturing by the image capturing unit, and
    the slave device control unit transmits a sleep request to the identified second slave device for transitioning into a sleep state.

3. The control apparatus according to claim 2, the at least one processor further causing the control apparatus to act as:
    an output unit configured to output an image captured by the image capturing unit to an external apparatus, wherein
    the slave device control unit performs obtainment of information on a state of the slave device that has been identified by the identification unit, and
    the output unit outputs an image in which information obtained by the obtainment of information by the slave device control unit has been superimposed on the image captured by the image capturing unit.

4. The control apparatus according to claim 2, the at least one processor further causing the control apparatus to act as:
    an output unit configured to output an image captured by the image capturing unit to an external apparatus, wherein
    the slave device control unit performs obtainment of information on a state of the first slave device that has been identified by the identification unit,
    the output unit outputs, as metadata, information obtained by the obtainment of information by the slave device control unit together with the image captured by the image capturing unit.

5. The control apparatus according to claim 1, the at least one processor further causing the control apparatus to act as:

an output unit configured to output an image captured by the image capturing unit to an external apparatus, wherein the output unit outputs an image in which information on the first slave device identified by the identification unit has been superimposed on the image captured by the image capturing unit.

6. The control apparatus according to claim 1, the at least one processor further causing the control apparatus to act as:

an output unit configured to output an image captured by the image capturing unit to an external apparatus, wherein the output unit outputs, as metadata, information on the first slave device identified by the identification unit together with the image captured by the image capturing unit.

7. The control apparatus according to claim 1, wherein the registration unit, in a case where a slave device to be registered is positioned approximately in the center of the range of image capturing by the image capturing unit, executes a registration process and registers the information on the relative direction of existence of the first slave device with respect to the position of the image capturing unit at the time of execution of the registration process.

8. The control apparatus according to claim 1, the at least one processor further causing the control apparatus to act as:

a drive control unit configured to control driving, in a pan direction and a tilt direction, of a direction of image capturing by the image capturing unit, wherein the registration unit registers, as the slave device information, values of the pan direction and the tilt direction in the drive control unit.

9. The control apparatus according to claim 1, the at least one processor further causing the control apparatus to act as:

a position and orientation obtaining unit configured to obtain a position and orientation of the image capturing unit, wherein the registration unit registers, as the slave device information, values of the position and orientation in the position and orientation obtaining unit.

10. The control apparatus according to claim 9, wherein the position and orientation obtaining unit includes an electronic compass and an encoder that is integrated in and/or external to the control apparatus.

11. The control apparatus according to claim 1, wherein the identification unit, in a case where there is a change in a position and orientation of the image capturing unit and the range of image capturing changes, executes the identification.

12. A method of controlling a control apparatus having an image capturing unit and configured to operate as a master device that controls a slave device, the method comprising:

registering slave device information of a slave device to be controlled by the control apparatus;

identifying, based on the registered slave device information, a first slave device that exists in a range of image capturing by the image capturing unit; and transmitting, if the first slave device is identified, a recovery request to the identified first slave device, wherein in the registering, information on a relative direction of existence of a slave device with respect to a position of the image capturing unit is registered as the slave device information.

13. A non-transitory computer-readable recording medium storing a program for causing a computer to execute a method of controlling a control apparatus having an image capturing unit and configured to operate as a master device that controls a slave device, the method comprising:

registering slave device information of a slave device to be controlled by the control apparatus;

identifying, based on the registered slave device information, a first slave device that exists in a range of image capturing by the image capturing unit; and transmitting, if the first slave device is identified, a recovery request to the identified first slave device, wherein in the registering, information on a relative direction of existence of a slave device with respect to a position of the image capturing unit is registered as the slave device information.

* * * * *